United States Patent
Hille et al.

(10) Patent No.: US 6,745,587 B1
(45) Date of Patent: Jun. 8, 2004

(54) INTEGRATED AIR CONDITIONING MODULE FOR A BUS

(75) Inventors: Andreas Hille, Renningen (DE); Robert C. Reimann, LaFayette, NY (US); Jack W. Sharbaugh, York, PA (US); Mark Colton, Clay, NY (US); Alan S. Drucker, Dewitt, NY (US); Christopher J. Dahar, Fulton, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/430,092

(22) Filed: May 6, 2003

(51) Int. Cl.$^7$ ................................................ B60H 1/32
(52) U.S. Cl. .............................. 62/244; 62/428; 62/507
(58) Field of Search .......................... 62/239, 244, 428, 62/429, 507

(56) References Cited

U.S. PATENT DOCUMENTS

| | | | | |
|---|---|---|---|---|
| 3,257,822 A | * | 6/1966 | Abbott | 62/428 |
| 4,748,825 A | * | 6/1988 | King | 62/244 |
| 4,761,967 A | * | 8/1988 | Sumikawa et al. | 62/201 |
| 4,787,210 A | * | 11/1988 | Brown | 62/89 |
| 4,888,959 A | * | 12/1989 | Brown | 62/244 |
| 5,184,474 A | * | 2/1993 | Ferdows | 62/244 |
| 5,307,645 A | * | 5/1994 | Pannell | 62/244 |
| 5,791,156 A | * | 8/1998 | Strautman et al. | 62/244 |

* cited by examiner

*Primary Examiner*—William E. Tapolcai
(74) *Attorney, Agent, or Firm*—Wall Marjama & Bilinski LLP

(57) ABSTRACT

An air conditioning module having all the necessary components for conditioning air, is so sized and arranged that, when placed in an internal compartment of a bus, has its respective openings register with an existing return air duct and a supply air duct on the bus. The compartments and modules are so arranged that they can be paired in back-to-back relationship, with one on each said of a longitudinal center line of the bus. Each of the modules has an intermediate partition dividing the module into an upper evaporator section and a lower condensing section. A mixer flap is placed in an intermediate position with respect to the partition such that its position may be selectively adjusted to thereby vary the amount of fresh air and return air that is passed through the condenser coil and evaporator coil, respectively.

30 Claims, 5 Drawing Sheets

US 6,745,587 B1

INTEGRATED AIR CONDITIONING MODULE FOR A BUS

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system which is integrated into the internal structure of a bus.

The conventional integrated bus air conditioning systems contain a condenser mounted in a luggage compartment and an evaporator mounted in the luggage compartment or in a separate compartment between the passenger compartment floor and the luggage compartment underneath the floor. The evaporator takes in the return air through a central return air duct mounted under the floor of the passenger compartment and blows the conditioned supply air into a side wall supply air duct. The condenser, which, is interconnected to the evaporator by a refrigerant tube, operates to condense the refrigerant in the circuit by way of the outside air that is brought in from and eventually discharged to the ambient air.

As part of the refrigeration circuit which is fluidly interconnected by tubing to both the evaporator and the condenser, an open drive reciprocating compressor is generally directly driven by a belt drive from the bus engine, such that the speed of the compressor is dependent on the speed of the drive engine. Accordingly, when the bus is at idle speed, for example, the capacity of the air conditioning system is substantially reduced. Further, the refrigeration connections between the compressor and the air conditioning system is generally expensive to install, difficult to service and somewhat unreliable because of possible refrigeration leaks and the need to maintain a compressor shaft seal.

Also typical of such a bus air conditioning system is the use of existing DC power to power the evaporator and condenser blower motors. Because of relatively low brush life for such motors, reliability and expense can also be a problem.

Also associated with the existing bus air conditioning systems is the problem of a component failure causing a complete loss of the air conditioning capacity. That is, with a single large unit as is now customary, failure of that unit such as, for example, a leaking hose causing loss of refrigerant, an electrical failure leading to inoperation of one of the components such as a fan, or a compressor failure, the entire unit is inoperable and no air conditioning can be provided to the unit. In such a situation, it would preferable if partial capacity could be maintained in order to provide a "limp home" capability.

It is therefore an object of the present invention to provide an improved integrated air conditioning system for a bus.

Another object of the present invention is the provision for an integrated air conditioning system that does not occupy a significant portion of a luggage compartment on a bus.

Yet another object of the present invention is the provision in a bus for an air conditioning system whose performance is not significantly affected by the engine speed of a bus.

Yet another object of the present invention is an integrated bus air conditioning system which is economical to install and reliable in use.

Yet another object of the present invention is an integrated bus air conditioning system that is accessible and easy to service.

Still another object of the present invention is an integrated air conditioning system for a bus which is economical to manufacture and effective in use.

Another object of the present invention is that of providing a "limp home" capability in the event of certain component failures.

These objects and other features and advantages become more readily apparent upon reference to the following descriptions when taken in conjunction with the appended drawings.

SUMMARY OF THE INVENTION

Briefly, in accordance with one aspect of the invention, a plurality of modules are placed under the floor of a passenger compartment of a bus, with each module having a complete air conditioning system which can be controlled independently of the speed of the engine.

By yet another aspect of the invention, each module has an invertor/controller which is interconnected to receive power for a generator and provide controlled AC power to the drive motors of a compressor and the condenser and evaporator blowers.

In accordance with another aspect of the invention, rather than a large single air conditioning unit, a plurality of relatively small identical modules can be installed on the roof of a bus, with each being capable of operating independently of the others so as to allow for the relatively low cost mass production of identical standardized units and also provide for a limp home capability in the event of failure of one or more units.

By yet another aspect of the invention a plurality of compact modules are slidably installed into or near a luggage compartment of a bus so as to facilitate easy access for servicing the units.

In accordance with another aspect of the invention, the modules are so designed that, when installed in their positions on the bus, their supply air outlet opening and return air inlet openings register with the existing supply air duct and return air duct on the bus.

In the drawings as hereinafter described, a preferred embodiment is depicted; however various other modifications and alternate constructions can be made thereto without departing from the true sprit and scope of the invention.

DESCRIPTION OF THE PREFERRED EMBODIMENT

Figure 1:
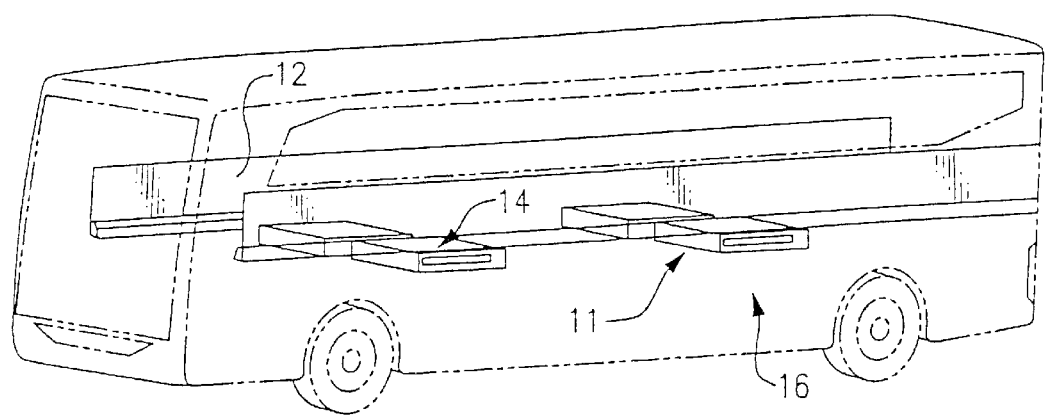
FIG. 1 is a perspective view of the modules of the present invention as installed in a bus.

Referring now to FIG. 1, the inventive modules are shown at 11 as installed in a typical passenger bus having an existing side wall duct system 12 and an existing return air duct 13, both extending longitudinally on the bus. The side wall duct system is located within the side walls and communicates with the passenger compartment by way of a plurality of openings. The return air duct 13 is located along the longitudinal center line of the bus, near or just under the flooring or seats, and fluidly communicates with the passenger compartment by way of a number of openings.

As will be seen, the modules 14 are located below the floor of the passenger compartment and above the luggage compartments 16, and are preferably slidably installed to allow for easy access to accommodate servicing. They are relatively shallow in height and therefore occupy a relatively small space. They are paired, in back-to-back relationship, with the longitudinal position thereof being adjustable to meet the needs of the individual bus application. The manner in which they interface with the existing side wall ducts 12 and the return air duct 13 will be described hereinafter.

Figure 2:
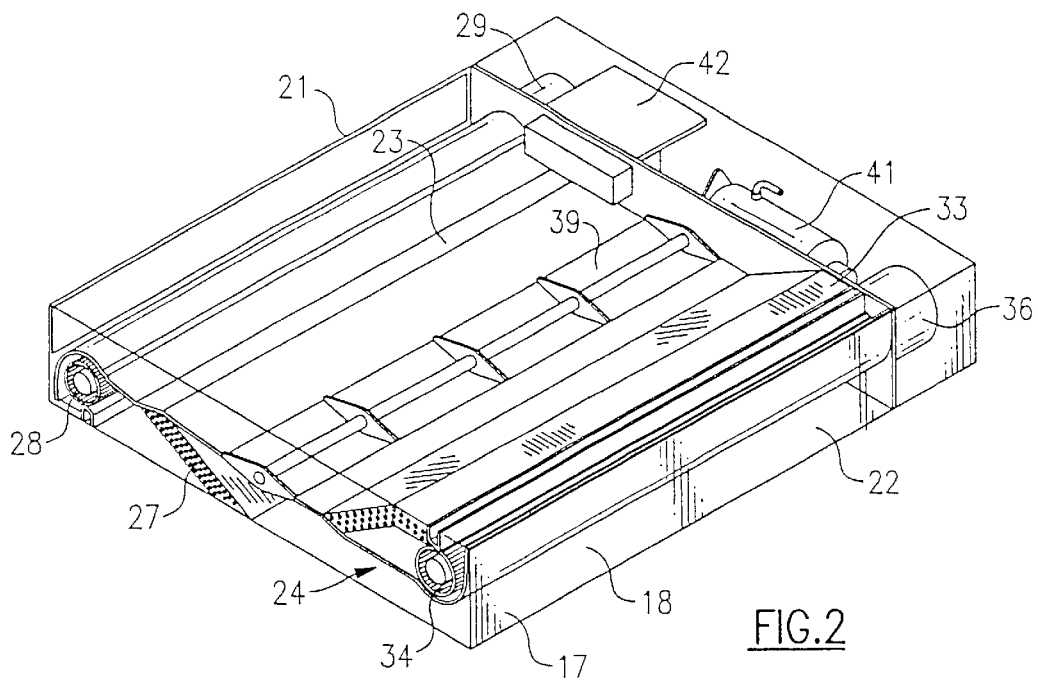
FIG. 2 is a perspective view of a module in accordance with the present invention.
Figure 3:
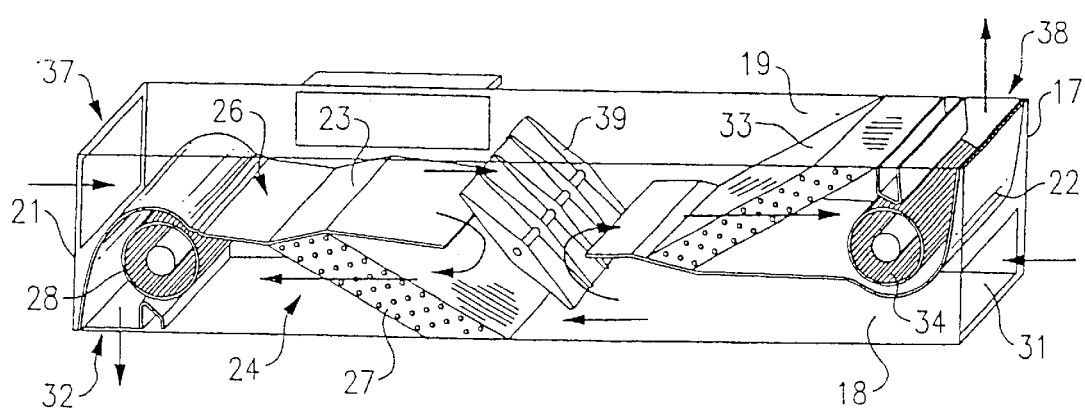
FIG. 3 is a cutaway perspective view thereof.

The construction and components of the module 14 can be seen in FIGS. 2 and 3 wherein a housing 17 includes a lower wall 18, an upper wall 19, an inner end wall 21 and an outer end wall 22. An intermediate partition 23 divides the internal space between a condenser section 24 in the lower portion of the housing and an evaporator section 26 in an upper portion thereof. Within the condenser section 24 is a condenser coil 27 and a condenser fan 28. The condenser fan 28 is of the draw-thru type which functions to draw outdoor air into a condenser air intake opening 31, pass through the condenser 27 and flow out of the housing by way of a condenser fan discharge opening 32 to the atmosphere.

Within the evaporator section 26 there is disposed an evaporator coil 33 and a evaporator fan 34 driven by an evaporator fan motor 36. The evaporator fan 34 is also the draw-thru type which acts to draw air into the evaporator air intake opening 37, through the evaporator 33 and out a supply air outlet opening 38. Both the condenser fan 28 and the evaporator fan 34 are of the transverse type as shown and preferably have forward swept blades.

Near the longitudinal mid point of the module, the intermediate partition 23 is made discontinuous and a fresh/return/exhaust air flap 39 is hindgely mounted therein so as to selectively mix the various flows of air as described hereinabove such that portions of those air streams are diverted to other flow streams within the module as will be more fully described hereinafter.

Figure 4:
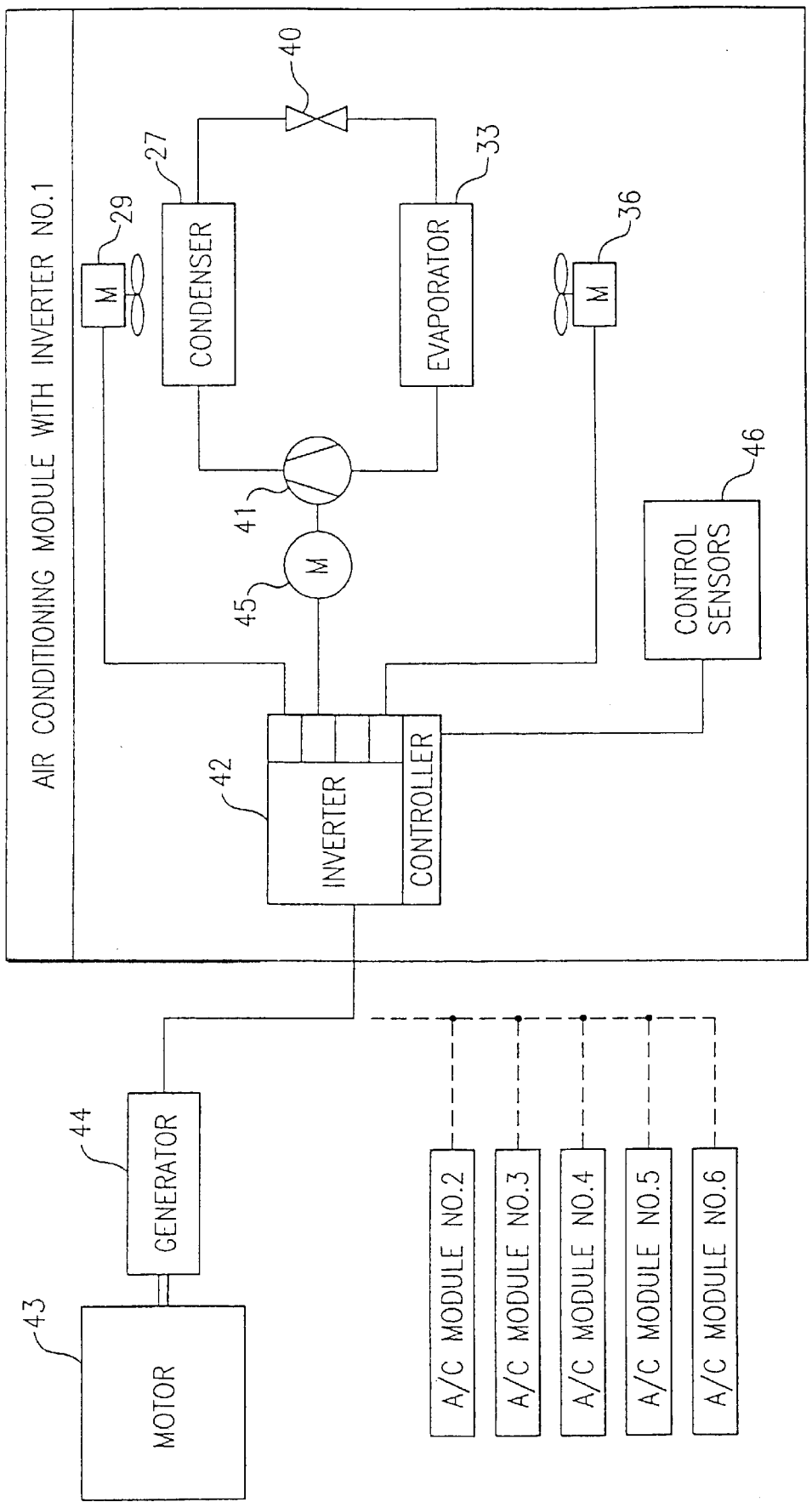
FIG. 4 is a schematic illustration of the electrical power connections on the module.

Also disposed within the housing 17 is a refrigeration circuit as shown in FIG. 4 to include a compressor 41 driven by an electric motor 45 and with its discharge being fluidly connected to the condenser 27, which in turn is fluidly connected to an expansion valve 40 which discharges to the evaporator 33, which in turn is fluidly connected to the compressor intake to complete the circuit. This closed circular refrigeration system operates in a conventional manner to circulate refrigerant which, by the various changes of state, provides for cooling of air at the evaporator coil 27 and the condensing of the refrigerant as it passes through the condenser 28. An invertor 42 is also provided within the module for the purpose of providing power to the various components within the module.

The providing of power to the module occurs by way of the circuitry as shown in FIG. 4 wherein the bus motor or engine 43 drives a generator 44 which in turn feeds electrical power to the inverter/controller 42. Controlled power is then provided by the inverter/controller 42 to the individual motors 29, 45 and 36 as shown, with the controller responding to control sensors 46 to discreetly control the speed of the respective motors. Each of the modules mounted in the bus have a similar inverter and control apparatus that is fed by the generator to provide AC power to its various drive motors.

Figure 5:
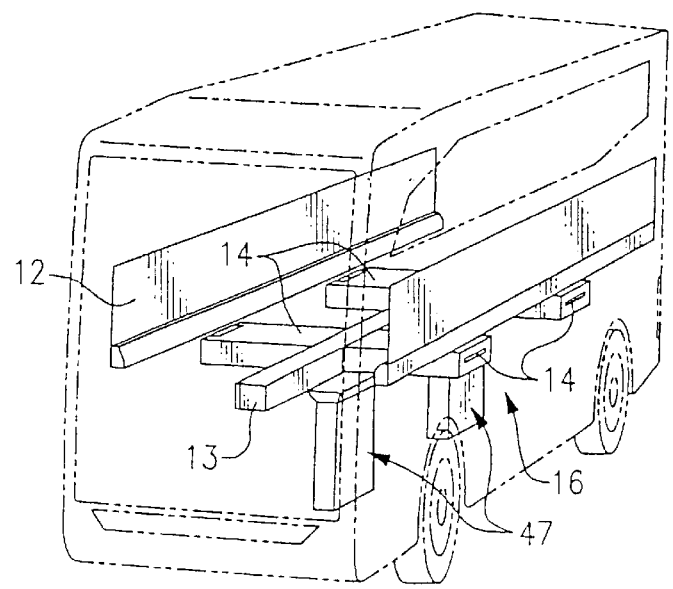
FIG. 5 shows the air flow connections between the module and the existing ducts on the bus.
Figure 6:
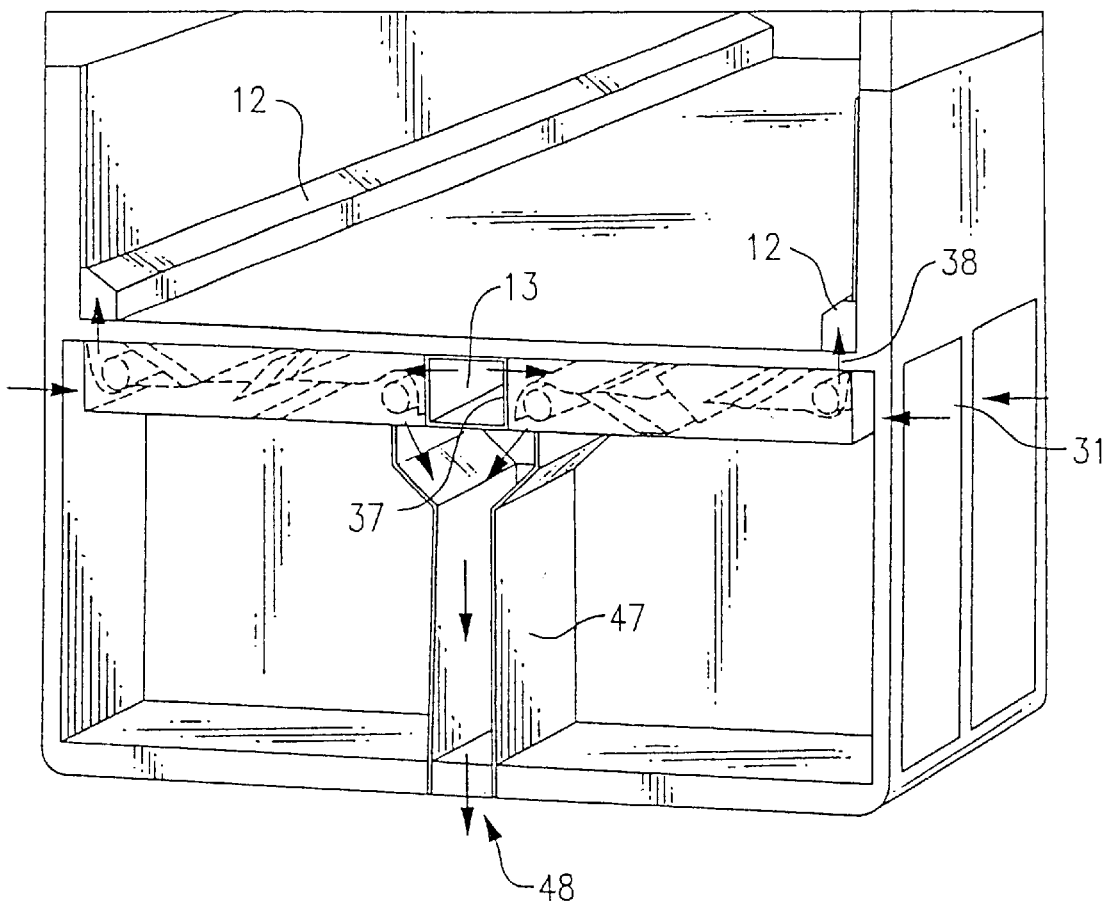
FIG. 6 is an expanded view of a portion thereof.

Referring now to FIGS. 5 and 6, there is shown the manner in which the individual modules are mounted within the bus so as to interface with the existing side wall duct system 12 and return air duct system 13. In essence, the individual modules are identical and are sized and so arranged that when inserted into the opening under the floor of the bus, the evaporator air intake opening 37 registers with an opening in the existing return air duct 13, and the supply air outlet opening 38 registers with the opening in the existing side wall duct system 12 as shown. In addition, the condenser air intake opening 31 is disposed near the outer side of the bus wherein fresh air can be taken in from outside.

In conventional integrated bus air conditioning systems, wherein the condenser is located in a luggage compartment, there is a passage from the luggage compartment for providing fluid communication from the condenser discharge opening to the outside. Accordingly, there is no existing condenser outlet duct that will suffice for use with the present modules. Thus, this component must be added as shown at 47 in FIGS. 5 and 6. Here, a single condenser air outlet duct 47 communicates at its upper portion with each of the identical modules on either side of the center line of the bus, and acts to conduct the flow of air from the condenser fan discharge opening 32 of each to a discharge opening 48 at the lower end of the condenser air outlet duct 47 as shown.

Figure 7A:
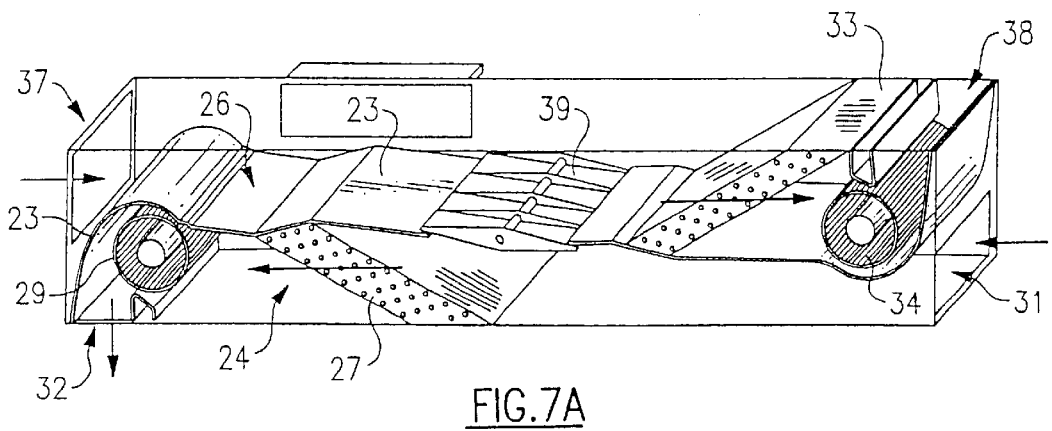
FIGS. 7a–7c show cutaway perspective views of the modules with the air flow patterns for different positions of the mixing flap.
Figure 7B:
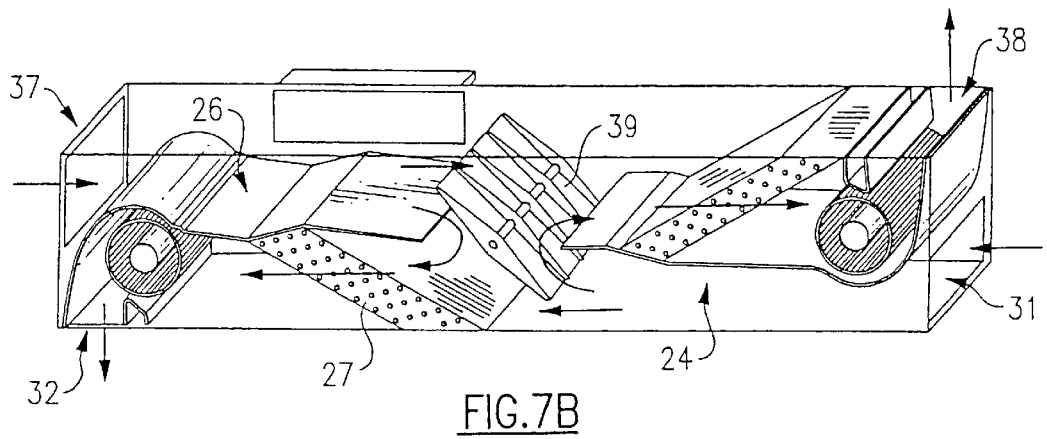
Figure 7C:
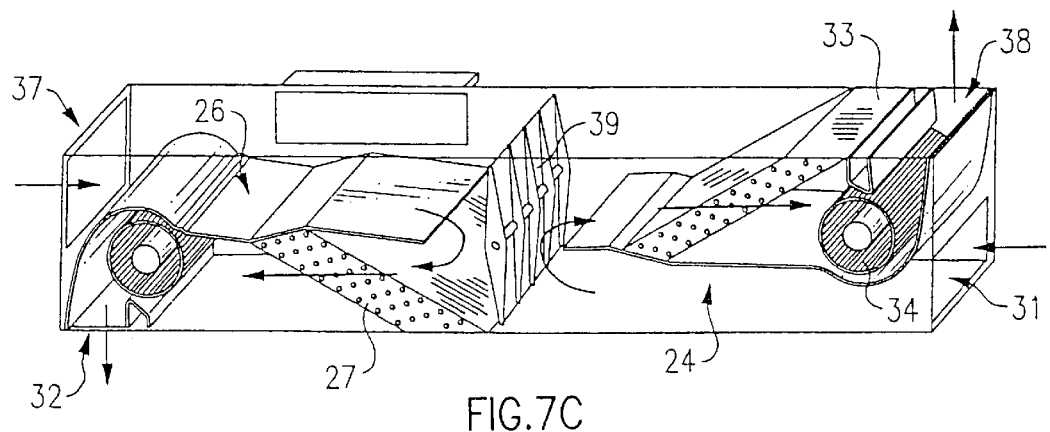

Referring now to FIGS. 7a–7c, the fresh air flap 39 is shown in various positions for selectively directing the flow of air within both the condenser section 24 and evaporator section 26 and for mixing the flows within the two sections.

FIG. 7a, the fresh air flap is in a horizontal position such that it simply forms a continuation of the intermediate partition 23. When in this position, all of the return air passes through the evaporator section 26 and through the evaporator coil 33 to be discharged out the supply air outlet duct 38. Similarly, all of the fresh air from the outside passes into the condenser air intake opening 31, passes through the condenser coil 27, and is discharged from the condenser fan discharge opening 32.

In FIG. 7b, the fresh air flap 39 is in an intermediate position wherein a portion of the return air is diverted from the evaporator section 26 and passes downwardly to enter the stream of air passing through the condenser coil 27 and out the condenser fan discharge opening 32. At the same time, a portion of the fresh air is diverted from the condenser section 24 to pass upwardly into the evaporator section 26, through the evaporator coil 33 and out the supply air outlet opening 38. In this way a portion of the return air is discharged outside and is replenished with fresh air from outside which is then cooled and then supplied to the supply air ducts.

In FIG. 7c, the fresh air flap 39 is placed in the vertical position wherein it completely blocks the flow of air flowing through both the condenser section 24 and evaporator section 26. When in this position all of the return air entering the evaporator air intake opening 37 passes through the condenser coil 27 and is discharged out the condenser fan discharge opening 32, and all of the fresh air passes from the condenser section 24 to the evaporator section 26, through the evaporator coil 33 and out the supply outlet air opening 38.

It should, of course, be understood that the fresh air flap 39 can be placed in any other intermediate position not shown in order to obtain the desired mixtures that will meet the needs of the particular bus application, while at the same time taking into account the environmental conditions outside.

While this invention has been described with reference to the particular structure disclosed herein it should be understood that it is not confined to the details set forth in this application, but is rather intended to cover any modifications and changes as may come within the scope of the following claims:

We claim:

1. An air conditioning system for a bus having a return air duct extending longitudinally within the bus and with a plurality of inlet openings leading from a passenger compartment and a supply air duct extending longitudinally within the bus and with a plurality of outlet openings leading to the passenger compartment comprising:
    at least one module to be installed into an internal compartment on the bus, said module having a supply air outlet opening which when the module is installed in the compartment, registers with an inlet opening in said supply air duct and having an evaporator air intake opening which, when the module is installed into the compartment, registers with an outlet opening in said return air duct;
    wherein said module includes a condenser fan that discharges air from a condenser fan discharge opening which, when the module is installed into the internal compartment, registers with a condenser air outlet duct which leads from the internal compartment to the outside.

2. An air conditioner as set forth in claim 1 wherein said module also includes an evaporator fan that draws air from said evaporator air intake opening and discharges air directly to said supply air outlet opening.

3. An air conditioner as set forth in claim 2 wherein said evaporator fan is of the transverse type.

4. An air conditioner as set forth in claim 1 wherein said condenser fan is of the transverse type.

5. An air conditioner as set forth in claim 1 wherein said module includes a condenser air intake opening and wherein said condenser fan draws air from the outside, through said condenser air intake opening, through the condenser and to the outside.

6. An air conditioner as set forth in claim 1 wherein said condenser air outlet duct extends downwardly and fluidly communicates with the outside.

7. An air conditioner as set forth in claim 6 wherein said condenser air outlet duct is located substantially on a longitudinal center line of the bus.

8. An air conditioner as set forth in claim 1 wherein said module includes a condenser coil, an evaporator coil and an expansion valve.

9. An air conditioner as set forth in claim 8 wherein said module further includes a compressor.

10. An air conditioner as set forth in claim 8 wherein said module includes a fresh air flap which can be selectively positioned to simultaneously provide relative mixes of return air and fresh air passing to each of said evaporator coil and said condenser coil, with the amount of air being passed to said evaporator coil and said condenser coil, respectively, being in inverse relationship.

11. An air conditioner as set forth in claim 10 wherein the amount of return air being passed to said evaporator coil and said condenser coil, respectively, is in inverse relationship.

12. An air conditioner as set forth in claim 1 wherein said return air duct is located substantially on a longitudinal center line of the bus.

13. An air conditioner as set forth in claim 1 wherein said return air duct is located under said passenger compartment.

14. An air conditioner as set forth in claim 1 wherein supply air duct is located in a side wall of said passenger compartment.

15. An air conditioner as set forth in claim 1 wherein said compartment in which said module housing is installed is located under a floor of said passenger compartment.

16. An integrated air conditioning system in a bus having a return air duct and a supply air duct, each extending longitudinally along the length of the bus comprising:
    at least one internal compartment in the bus for receiving at least one air conditioning module therein said module having an evaporator air intake opening that fluidly communicates with the return air duct, a supply air outlet opening that fluidly communicates with the supply air duct, and a condenser fan discharge opening; and
    a condenser air outlet duct installed in said bus and which, when said module is installed in said internal compartment, fluidly communicates with said condenser fan discharge opening at one end thereof and with the ambient air at the other end thereof.

17. An air conditioning system as set forth in claim 16 wherein said return air duct is located under a floor of a passenger compartment.

18. An air conditioning system as set forth in claim 16 wherein said return air duct is located and extends substantially along a longitudinal center line of said bus.

19. An air conditioning system as set forth in claim 16 wherein said supply air duct is disposed on a outer side of said bus.

20. An air conditioning system as set forth in claim 16 wherein said at least one compartment for receiving said module is located under a floor of a passenger compartment.

21. An air conditioning system as set forth in claim 16 wherein said at least one compartment is located on one side of the longitudinal center line of the bus.

22. An air conditioning system as set forth in claim 16 wherein said at least one compartment comprises plural compartments arranged on opposite sides of a longitudinal center line of said bus.

23. An air conditioning system as set forth in claim 16 wherein said module includes a condenser, an evaporator, and an expansion valve.

24. An air conditioning system as set forth in claim 23 wherein said module includes a compressor.

25. An air conditioning system as set forth in claim 16 wherein said module includes a condenser air intake opening that fluidly communicates with ambient air.

26. An air conditioning system as set forth in claim 16 wherein said condenser air outlet duct extends downwardly within said bus.

27. An air conditioning system as set forth in claim 1 wherein said at least one module comprises a plurality of modules.

28. An air conditioning system as set forth in claim 1 wherein said internal compartment is disposed adjacent to a luggage compartment of said bus.

29. An air conditioning module as set forth in claim 16 wherein said at least one air conditioning module comprises a plurality of modules.

30. An air conditioning module as set forth in claim 16 wherein said at least one compartment is disposed adjacent to a luggage compartment of said base.

* * * * *